March 18, 1969   P. PARKINSON ET AL   3,434,025
DRIVE SYSTEM EMPLOYING DUAL MOTORS
Filed Aug. 23, 1966

INVENTORS
PETER PARKINSON
THOMAS W. J. KENNEDY
BY
Westell & Hanley

United States Patent Office 3,434,025
Patented Mar. 18, 1969

3,434,025
DRIVE SYSTEM EMPLOYING DUAL MOTORS
Peter Parkinson and Thomas William John Kennedy, Ottawa, Ontario, Canada, assignors to Northern Electric Company Limited, Montreal, Quebec, Canada
Filed Aug. 23, 1966, Ser. No. 574,341
U.S. Cl. 318—8         12 Claims
Int. Cl. H02p 1/54

ABSTRACT OF THE DISCLOSURE

A method and apparatus for driving a load by a pair of direct current motors delivering opposed, unidirectional torque each through a gear train. A balanced bias current is continuously applied to the motors in the same sense as their drive currents while a drive current is applied to either one of the motors which is a function of a bias signal, a demand signal modified by a feedback signal proportional to the speed of the motor, and a signal proportional to the armature current of the motor.

---

The present invention relates to drive systems using dual motors which produce opposing output torques whereby a load may be driven in either of two directions.

Where it is desired to move large loads in opposing directions a geared drive system using a pair of direct current motors is advantageous. An example application of this type of drive system would be in a tracking device such as a telescope or a radio antenna where two such systems would be used, one dual motor system for movement of the device in azimuth and one dual motor system for movement of the device in elevation. In these examples the use of electric motors is preferred under adverse weather conditions where the use of hydraulic motors would give rise to maintenance problems, for example where the temperature may drop as low as −45° F. Of the different types of electric motors, the use of direct current motors is preferred since the drive system must be capable of a wide speed range which demands a drive system capable of a large percentage of its full output torque at less than 0.2 percent of its full speed. Finally, large slow speed direct current motors for driving the load directly through a single pinion and bull gear are unacceptable because of prohibitive cost, thus necessitating the use of reduction gearing.

The introduction of gearing into a reversible drive system creates a problem known as "backlash" which is a term used to define the angular movement of the drive shaft of a motor during torque reversal between the application of torque to the load in the opposite direction. A number of factors combine to produce backlash, namely gear tooth clearance and irregularities (i.e. the play between the gears) and distortion due to flexibility of members in the system (such as torsion in the motor armature shaft). Thus when a motor is transmitting a torque in one direction to a load the drive system is said to be "wound up" in that direction. When the sense of the drive torque against the load is reversed, the drive system must unwind and then wind up in the opposite direction before the full reverse torque can be applied through the system to the load.

The presence of backlash in a drive system creates several disadvantages, one of the most important being the delay in response to the associated control system. Backlash also causes wear on the tooth profile because of the impulsive loading of the gear teeth. This effect can be compounded by any sudden external forces impinging on the load, such as wind gusting against an exposed dish antenna.

It is an object of the present invention to provide a method and apparatus for controlling and eliminating backlash by means of a dual electric motor drive system where each motor selectively delivers unidirectional torque through a gear train to a load and where each motor produces, whether or not there is present a drive torque called for by the selective control, a torque (called a bias torque) in the same sense as that produced by the particular motor to drive the load.

Another object of the invention is to provide such a method and apparatus where a constant speed is maintained in the motors of the drive system under variations in the load torque.

An example embodiment of the invention will now be described with reference to the accompanying drawings in which.

Figure 1:
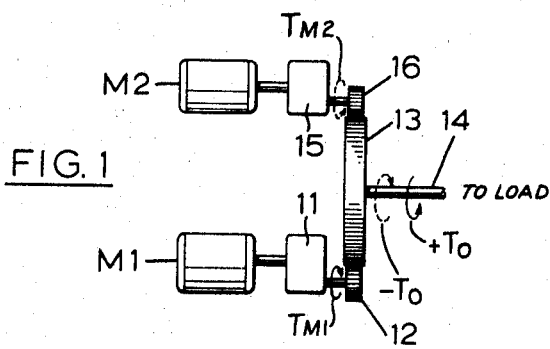
FIGURE 1 is a schematic view of a dual motor drive system.

In the drawings FIGURE 1 shows two direct current electric motors M1 and M2 which are capable of producing driving torques $T_{M1}$ and $T_{M2}$ respectively. Motor M1 drives, through a gear box 11, a pinion 12 meshed with a bull gear 13 connected by a shaft 14 with a load. Similarly motor M2 drives, through a gear box 15, a pinion 16 which is also meshed with bull gear 13. Motors M1 and M2 are matched to produce identical torques in response to identical signals but are connected to produce such torque in opposite senses, i.e. motor M1 produces a positive output torque $+T_O$ at load shaft 14 while motor M2 produces a negative output torque $-T_O$ on the load shaft in response to a selectively applicable control signal. Thus shaft 14 and its connected load are driven selectively in one direction by motor M1 and in the opposite direction by motor M2, the two motors being preferably diametrically opposed with respect to bull gear 13. It should be noted that the two motors M1 and M2 are not intended to share the load and do not, therefore, function in parallel; in other words they operate one at a time.

Now if, in addition to a driving torque, a low level torque is produced by each motor M1 and M2 in the same sense as such driving torque when present, it will be appreciated that motor M1 when not driving the load will act through bull gear 13 against the driving torque of M2 while at the same time the low level torque produced in motor M2 will augment its driving torque. Similarly when the load is being driven by motor M1 the low level torque in that motor will augment its driving torque while the low level torque in motor M2 will act against the driving torque of motor M1. This low level torque in any one motor may be designated as a biasing torque, since it acts against the driving torque of the other motor moving the load. Where the low level biasing torques in both motors M1 and M2 are equal they will balance one another when the load is not being driven. It will be appreciated that the presence of a biasing torque against bull gear 13 prevents the inertial forces of the load acting through the bull gear from unwinding the gear train of the driving motor when the driving torque of that motor is removed or when an external force such as a gust of wind is applied to the load to give a sudden torque acting in the same direction on the bull gear as the direction of the driving torque.

Figure 2:
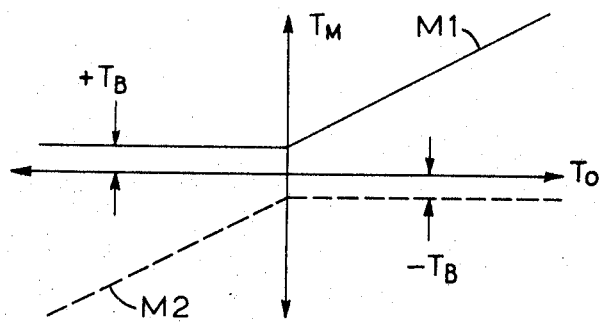
FIGURE 2 is a graphic representation of torque acting on a load in relation to the variation in torque of the two motors of FIGURE 1.

The relationship of output torque $T_O$ on load shaft 14 with respect to torque $T_M$ of motors M1 and M2 is shown graphically in FIGURE 2 of the drawings, $T_O$ being the sum of the torques of motors M1 and M2. It will be seen that when $T_O$ is zero, motors M1 and M2 produce equal but oppositely sensed bias torque outputs $T_B$. This has the effect of winding up both trains of gears 11 and 12. When a positive output torque $T_O$ is required (that is, a torque applied in a given direction), motor M1 increases its positive torque output above its positive bias level while motor M2 continues to deliver a constant negative bias torque. When a negative output torque $-T_O$ is required (that is, a torque applied in the direction opposite to that of the positive torque), motor M2 increases its negative torque output above its negative bias level while motor M1 continues to deliver a constant positive bias torque.

Figure 3:
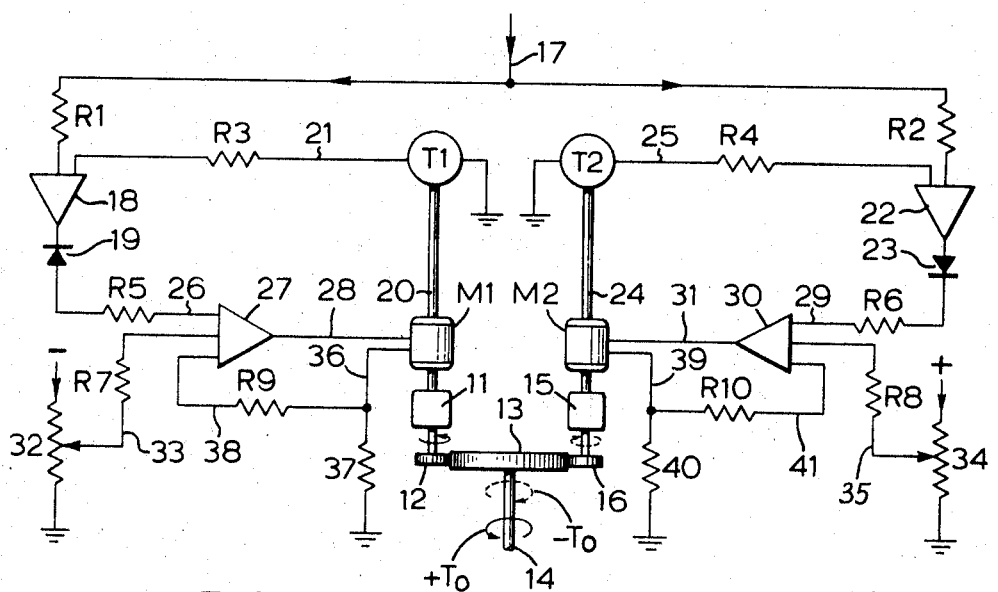
FIGURE 3 is a schematic diagram of a circuit incorporating the invention.

The energizing circuit of driving motors M1 and M2 is shown in FIGURE 3 of the drawings. In order to obtain a constant speed of rotation of output shaft 14 as represented by a given demand signal, despite variations in the load on the output shaft such as would occur by wind gusting on an antenna or a change in the mechanical resistance to rotation, a constant speed or "velodyne" drive system is associated with each drive motor M1 and M2. This system employs a tachometer-generator T in which signal output is proportional to speed. In the drive system associated with motor M1 demand signals, controlled from a remote source and proportional to a demanded velocity of movement of the load on shaft 14, are supplied along a line 17 through a resistance R1 to one input of an inverting summing control amplifier 18. A rectifier 19 is connected in series with the output of amplifier 18. A tachometer-generator T1 is mechanically connected by a shaft 20 to the armature shaft of motor M1 and is electrically connected by a line 21 through a resistance R3 to a second input of control amplifier 18 to provide a negative feedback signal proportional to the velocity of motor M1. The input signals on lines 17 and 21 fed to amplifier 18 are arithmetically combined so that the output of amplifier 18 is proportional to the difference of the demand and feedback signals. The polarity of the output of tachometer-generator T1 is arranged to be in such a sense and of such magnitude that the output of the summing amplifier is proportional to the difference of the desired motor shaft speed (as embodied in the value of the demand signal) and the actual motor shaft speed, subject to the fact that there is, under desired constant velocity conditions as well as at other times (with actual speed equal to desired speed), an output from amplifier 18 to compensate for losses due to friction, heat, thermal noise and the like, which output may be made as small as possible by feedback loop and amplifier design. It will be seen from the circuitry to be hereinafter described that the output signal from amplifier 18 represents an acceleration (torque) demand for motor M1 when driving the load, i.e. when the output of amplifier 18 is of a sense to pass rectifier 19. In the drive system associated with motor M2 demand signals are supplied along line 17 through a resistance R2 to one input of an inverting summing control amplifier 22 having a rectifier 23 connected in series with the output thereof. A tachometer-generator T2 is mechanically connected by a shaft 24 to the armature shaft of motor M2 and is electrically connected by a line 25 through a resistance R4 to a second input of control amplifier 22 to provide a negative feedback signal proportional to the velocity of motor M2. The input signals from lines 17 and 25 are combined arithmetically so that the output of amplifier 22 is proportional to their difference. The polarity of the output of tachometer-generator T2 is arranged to be in such a sense and of such a magnitude that the output of amplifier 22 is proportional to the difference of the desired and actual shaft speeds of motor M2, there being always an output from amplifier 22 to compensate for losses as in motor M1.

Rectifier 19 is poled to gate or pass output signals of one sense from amplifier 18 and to reject output signals in the other sense. The gated signal represents an acceleration or torque demand for motor M1. Similarly rectifier 23 is poled to gate or pass output signals from amplifier 22 which are in the opposite sense to those passed by rectifier 19 and which provide a positive acceleration or torque demand for motor M2. Rectifiers 19 and 23 are preferably diodes.

The output of rectifier 19 is connected by a line 26 through a resistance R5 to one of three inputs of a summing power amplifier 27. The output of amplifier 27 is connected by a line 28 to the armature of motor M1. The output of rectifier 23 is connected by a line 29 through a resistance R6 to one of three inputs of an inverting summing power amplifier 30, the output of which is connected by a line 31 to the armature of motor M2.

A bias signal is supplied to a second input of power amplifier 27 from a source through an adjustable potentiometer 32 and a line 33 from the potentiometer through a resistor R7 to such second input of the power amplifier. The bias signal through line 33 is of the same sense as the control signal in line 26 when such signal is passed by rectifier 19. Another and separate bias signal is supplied to a second input of power amplifier 30 through an adjustable potentiometer 34 and a line 35 connected through a resistor R8 to such second input of the power amplifier, the bias signal through line 35 being of the same sense as the control signal through line 29, when such signal is passed by rectifier 23, and of opposite sense to the bias signal in line 33. Power amplifier 27 is designed to sum the bias signal through line 33 with a control signal through line 26 when passed by rectifier 19, while power amplifier 30 is designed to sum the bias signal through line 35 with a control signal through line 29 when passed by rectifier 23.

The armature winding of motor M1 is connected, on the side electrically remote from line 28, to ground by a line 36 through a resistor 37 of low value compared with the resistance of the motor armature. A line 38 leads from line 36, between the armature winding of motor M1 and resistor 37, through a resistor R9 to a third input of power amplifier 27. Line 38 provides a signal proportional to the armature current of motor M1 and amplifier 27 is designed so that the signal on line 38 acts as negative feedback relative to the demand signal on line 26 (when existing) and the bias signal on line 33. Thus power amplifier 27 arithmetically combines the input signals from lines 26 (when existing), 33 and 38. Similarly the armature winding of motor M2 is connected by a line 39, on the side electrically remote from line 31, through a low value resistor 40 to ground. A line 41 leading from line 39, between the armature winding of motor M2 and resistor 40, through a resistor R10 to a third input of power amplifier 30 supplies a negative feedback signal to that amplifier proportional to the armature current of motor M2. Thus power amplifier 30 arithmetically combines the input signals from lines 29 (when existing), 35 and 41.

To operate the drive system from a stationary position of the load, a control signal is transmitted through line 17 demanding a specific velocity or speed of rotation of the load on output shaft 14. Assume first that motor M1 is to drive the load and that a hypothetical steady state condition exists, i.e. there are no external forces, such as wind gusting on a dish antenna, acting on the load. The control signal through line 17 will be amplified by control amplifiers 18 and 22 but will be blocked by either rectifier 19 or rectifier 23. If motor M1 is to drive the load, rectifiers 19 and 23 will be arranged so that rectifier 19 passes the amplified control signal while rectifier 23 blocks the signal. The resultant amplified signal on line 26 will be further amplified by power amplifier 27 to provide current to the armature of motor M1. No signal will appear on line 29 and therefore no current will be supplied to motor M2.

A bias signal on line 33 of the same sense as the signal on line 26 will also be amplified by power amplifier 27 (modified by negative feedback in line 38) to feed bias current through line 28 to motor M1 and the bias torque produced by this current will be counterbalanced by a bias torque in motor M2 produced by current in line 31 resulting from amplification of a bias signal on line 35 amplified by power amplifier 30 (modified by negative feedback in line 41).

As motor M1 accelerates tachometer-generator T1 will supply an increasing negative feedback through line 21 to control amplifier 18 which will reduce the signal on line 26 and hence the supply current from the power amplifier 27 to motor M1. Hence the acceleration of motor M1 will taper off as the motor approaches the demanded speed.

The current from line 28 through the armature of motor M1 causing acceleration of the motor will also result in negative feedback through line 38 to power amplifier 27 which will cause a decrease in the current in line 28 and, when motor M1 has achieved the demanded speed, will tend to stabilize the current in line 28 (which is the sum of the currents resulting from the demand signal on line 26 and the bias signal on line 33), thus compensating for internal fluctuations.

At the demanded speed the signals in lines 26 and 33, modified by negative feedbacks through line 21 and line 38, will achieve a steady state condition and the output from control amplifier 18 will be just enough to maintain a constant velocity of motor M1.

The control signal in line 17 demanding a velocity of motor M1 will be blocked by rectifier 23 so that the only inputs to power amplifier 30 are the signals on lines 35 and 41 whereby motor M2 is caused, by the sense of the bias signal on line 35, to exert opposing torque which tends to be maintained constant by the compensating effect of the negative feedback through line 41.

As the load is being driven by motor M1 the negative feedback from tachometer-generator T1 will compensate for conditions affecting the velocity of the load on shaft 14. Thus if the load accelerates there will be a proportional acceleration of motor M1 resulting in an increased negative feedback through line 21 to reduce the signal output from control amplifier 18 which will reduce the current in line 28 and decrease the torque applied to motor M1. Similarly a decreased velocity of the load will result in a decreased negative feedback through line 21 and an increase in the current in line 28 to provide increased torque and acceleration of the load. Again, the current in line 28 will taper off as motor M1 approaches the given speed demanded by the control signal in line 17.

An increase in the control signal in line 17 demanding an increased speed of motor M1 (and velocity of the load) will result in the same sequences outlined above. Further, the acceleration will be independent of the starting speed (i.e. the speed existing before the control signal was changed) since the negative feedback through line 38 will compensate for varying conditions such as back E.M.F.

Where the control signal on line 17 is decreased to demand a lesser speed of motor M1, the negative feedback through line 21 will be greater than the decreased control signal and the output of control amplifier 18 will be blocked by rectifier 19 whereupon motor M1 and the load will slow down until the negative feedback becomes less than the control signal whereupon the same adjusting and steady state conditions will prevail as outlined above.

The negative feedbacks through lines 38 and 41 provided a broadband response to variations in torque required to maintain a constant given speed of the load. In addition this negative feedback minimizes the effects of commutator ripple. Also, a fast response is achieved because of the internal negative feedback loop through lines 38 and 41. It will be appreciated that the bias circuit provides a low power solution to the problem of biasing since no separate bias source of a high VA rating is required.

The strength of the bias current fed into motors M1 and M2 should, as mentioned before, be sufficient to provide a bias torque large enough to prevent the gear train of the idling motor M1 or M2 from losing mesh as the load is decelerated by the gear train of the driving motor. The bias torque must also serve to keep the gears meshed as tooth irregularities become exposed during periods of low net drive torque. An adjustable bias torque of up to ten percent of the full output torque of motor M1 or M2 is considered adequate for this purpose.

The term "arithmetically combined" where used in the disclosure and claims means combined algebraically, either added or subtracted.

We claim:

1. In the operation of a geared system to drive a load, said system having a pair of direct current electric motors connected to drive said load selectively in opposing torque relationship each delivering unidirectional torque to said load, the method comprising: providing (a) a bias signal, providing (b) a signal opposite in sense to said bias signal substantially proportional to the armature current of one of said motors, and providing (c) a demand signal of the same sense as said bias signal and modified by negative rate feedback of said one motor proportional to the speed thereof and selectively applying to the armature of said one motor a current signal which is a function of (a), (b), and (c); further providing (d) a bias signal of a sense to cause torque in said other motor opposing the torque created by said bias signal in said one motor, and providing (e) a signal of opposite sense to said last mentioned bias signal substantially proportional to the armature current of said other motor; combining (a), (b), and when existing (c) arithmetically, the effects of (a) and (b) being relatively weighted so that in the absence of (c) the effect of (a) is greater than the effect of (b).

2. A method as claimed in claim 1 in which said negative rate feedback of each of said motors is produced by the operation of a pair of tachometer-generators one mechanically connected with the armature of each of said motors.

3. A method as claimed in claim 1 in which said signal proportional to the armature current is a negative feedback signal.

4. A method as claimed in claim 1 in which said demand signal is a common control signal applied to a pair of circuits one including the armature of each of said motors, determining in accordance with the sense of said demand signal to which of the motor circuits it is to be applied, and in the motor circuit to which it is applied combining said demand signal with said bias signal and said signal proportional to the armature current.

5. In a geared system to drive a load, said system having a pair of direct current electric motors connected to drive said load selectively in opposing torque relationship each delivering unidirectional torque to said load; means for selectively applying to the armature of one of said motors a current which is a function of (a) a bias signal, (b) a signal opposite in sense to said bias signal substantially proportional to the armature current of said motor to which said selectively applicable signal is applied, and (c) a demand signal of the same sense as said bias signal and modified by negative rate feedback of said one motor proportional to the speed thereof; means for applying to the other of said motors a current which is a function of (d) a bias signal of a sense to cause torque in said other motor opposing the torque created by said bias signal in said one motor, and (e) a signal of opposite sense to said last mentioned bias signal substantially proportional to the armature current of said other motor; where (a) and (b), and (c) when existing, are combined arithmetically, the effects of (a) and (b) being relatively weighted so that in the absence of (c) the effect of (a) is greater than the effect of (b).

6. A drive system as claimed in claim 5 in which a pair of tachometer-generators are mechanically connected one to the armature of each of said motors whereby said negative rate feedback is produced.

7. A drive system as claimed in claim 5 in which a negative feedback loop is connected with the armature of each of said motors remote from said current applying means, whereby said signal proportional to the armature current of said motor is supplied.

8. A drive system as claimed in claim 5 in which said demand signal is a single control signal applied to a pair of circuits one including the armature of each of said motors, means to determine in accordance with the sense of said demand signal to which of said circuits it is to be applied, and means in the motor circuit to which the demand signal is applied for combining said demand signal with said bias signal and said signal proportional to the armature current.

9. A drive system comprising: (1) a pair of direct current electric motors connected to be selectively energized for delivery of unidirectional torque of opposite senses through gearing to a load; (2) a pair of circuits one including the armature of each of said motors; (3) a common demand signal source reversibly sensed for said selective energization; (4) a pair of balanced bias signal sources one for each of said circuits; (5) means in each of said circuits to provide a negative rate feedback signal proportional to the speed of each of said motors; (6) means in each of said circuits to provide a negative current feedback signal proportional to the armature current in the motor of said circuit; (7) a control amplifier in each of said circuits to sum said demand signal and said negative rate feedback signal in said circuit; (8) means in each circuit connected with the output of the control amplifier in said circuit to selectively pass the output signal thereof in accordance with the sense of the demand signal; (9) a power amplifier in each of said circuits having inputs connected to sum the output signal of said passing means, said bias signal, and said negative current feedback signal, the output of the power amplifier being connected with the armature of the motor.

10. A drive system as claimed in claim 9 in which said passing means in each circuit comprises a pair of rectifiers.

11. A drive system as claimed in claim 10 in which said rectifiers are diodes.

12. A drive system as claimed in claim 9 in which said negative rate feedback means in each circuit comprises a tachometer-generator mechanically connected with the motor of said circuit.

References Cited

UNITED STATES PATENTS

| | | | |
|---|---|---|---|
| 2,778,280 | 1/1957 | Trofimov | 318—48 X |
| 2,806,191 | 9/1957 | Montrose-Oster | 318—8 |
| 3,039,034 | 6/1962 | Lee | 318—48 |
| 3,351,830 | 11/1967 | Samson et al. | 318—48 |

ORIS L. RADER, *Primary Examiner.*

B. A. COOPER, *Assistant Examiner.*

U.S. Cl. X.R.

318—48